US012709518B2

(12) United States Patent
Talonen et al.

(10) Patent No.: US 12,709,518 B2
(45) Date of Patent: Aug. 18, 2026

(54) ELEVATOR SAFETY MONITORING SYSTEM, ELEVATOR SYSTEM, ELEVATOR DRIVE UNIT, AND METHOD FOR OPERATING AN ELEVATOR

(71) Applicant: KONE Corporation, Helsinki (FI)

(72) Inventors: Tapani Talonen, Helsinki (FI); Kari Rahkonen, Helsinki (FI); Tapio Siironen, Helsinki (FI); Mikko Viljanen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1434 days.

(21) Appl. No.: 17/235,145

(22) Filed: Apr. 20, 2021

(65) Prior Publication Data

US 2021/0371241 A1 Dec. 2, 2021

(30) Foreign Application Priority Data

May 26, 2020 (EP) .................................... 20176453

(51) Int. Cl.
*B66B 5/00* (2006.01)
*B66B 1/32* (2006.01)
(Continued)

(52) U.S. Cl.
CPC .............. *B66B 5/0031* (2013.01); *B66B 1/32* (2013.01); *B66B 1/3492* (2013.01); *B66B 5/028* (2013.01); *B66B 5/06* (2013.01)

(58) Field of Classification Search
CPC ....... B66B 5/0031; B66B 1/32; B66B 1/3492; B66B 5/028; B66B 5/06; B66B 5/0056;
(Continued)

(56) References Cited

U.S. PATENT DOCUMENTS 5,070,967 A * 12/1991 Katzy ................... B66B 1/3492
187/394
6,170,614 B1 * 1/2001 Herkel ...................... B66B 1/32
187/287
(Continued)

FOREIGN PATENT DOCUMENTS

CN 103079980 A 5/2013
CN 104144868 A 11/2014
(Continued)

OTHER PUBLICATIONS

European Search Report issued in EP 20 17 6453, dated Nov. 3, 2020.

*Primary Examiner* — Bickey Dhakal
(74) *Attorney, Agent, or Firm* — Birch, Stewart, Kolasch & Birch, LLP

(57) ABSTRACT

An elevator safety monitoring system, an elevator system, an elevator drive unit, and a method for operating an elevator are presented. The elevator safety monitoring system includes an elevator car absolute position and speed feedback device, a safety monitor connected to the absolute position and speed feedback device, and a safety zone extending inside an elevator shaft. The safety zone is associated with an allowable maximum speed of an elevator car, wherein the allowable maximum speed is lower than a rated speed of an elevator car outside the safety zone, wherein the safety monitor is configured to determine a slowdown failure of the elevator car approaching the safety zone, and, upon the determination of the slowdown failure, command an actuator to decelerate the elevator car to the allowable maximum speed.

20 Claims, 5 Drawing Sheets

(51) Int. Cl.

| | |
|---|---|
| ***B66B 1/34*** | (2006.01) |
| ***B66B 5/02*** | (2006.01) |
| ***B66B 5/06*** | (2006.01) |

(58) Field of Classification Search

CPC B66B 1/30; B66B 1/3415; B66B 1/36; B66B 5/0018; B66B 5/0037; B66B 2201/403

See application file for complete search history.

(56) References Cited

U.S. PATENT DOCUMENTS

| | | | | |
|---|---|---|---|---|
| 7,533,763 | B2 * | 5/2009 | Kattainen | B66B 1/28 187/394 |
| 2004/0079591 | A1 | 4/2004 | Mueller | |
| 2020/0339381 | A1 * | 10/2020 | Viljanen | B66B 5/06 |

FOREIGN PATENT DOCUMENTS

| | | | |
|---|---|---|---|
| CN | 110745658 | A | 2/2020 |
| EP | 3 599 200 | A1 | 1/2020 |
| JP | 6-211448 | A | 8/1994 |
| WO | WO 2004/028947 | A1 | 4/2004 |
| WO | WO 2006/082275 | A2 | 8/2006 |
| WO | WO 2006/082275 | A3 | 8/2006 |
| WO | WO 2013/035376 | A1 | 3/2013 |

* cited by examiner

ELEVATOR SAFETY MONITORING SYSTEM, ELEVATOR SYSTEM, ELEVATOR DRIVE UNIT, AND METHOD FOR OPERATING AN ELEVATOR

FIELD OF THE INVENTION

The present invention relates in general to elevators. In particular, however, not exclusively, the present invention concerns safe operation of the elevators.

BACKGROUND

An elevator comprises an elevator car and a hoisting machine. The car is driven with the hoisting machine by means of hoisting ropes running via the traction sheave of the hoisting machine. To move the car, a motion profile is determined in the control system of the elevator. It is desirable that the motion profile provides smooth acceleration of the elevator car to a rated speed and then smooth deceleration before stopping the elevator car at the destination, such as to a landing of the elevator.

Typically, an elevator shaft has safety equipment, such as pit buffers, dimensioned to absorb kinetic energy of colliding elevator car. In known elevators, the safety equipment also defines safety spaces inside the elevator shaft.

In some cases, the shaft volume covered by the safety equipment may be reduced, for example, with short pit buffers. This means that there would be no adequate space for human protection inside the shaft. As a remedy, additional safety device may be used to establish safety zone, which may extend into shaft section normally (i.e. during normal elevator operation) allocated for elevator service. When activated, it establishes temporary safety space into the safety zone, offering a safe operating environment for maintenance and installation personnel working inside the shaft. Such additional safety devices may be pre-triggered safety devices or movable stops, for example, turnable buffers. In the active state they stop movement of an elevator car already before arrival to the terminal landing. Therefore, during the normal elevator operation they must be in their inactive state such that the destination landing at the safety zone is reachable by the elevator service.

A failure or an error, however, can cause unintentional activation of these safety devices during the normal elevator operation and, therefore, they have been dimensioned to absorb kinetic energy in that situation also, that is with a full load and a rated speed of the elevator. Therefore, the safety devices are large and heavy, and can be expensive, take substantial amount of space and need substantial amount of manpower for activating and deactivating. This is especially true in elevators with high rated speeds.

SUMMARY

An objective of the present invention is to provide an elevator safety monitoring system, an elevator system, an elevator drive unit, and a method for operating an elevator. Another objective of the present invention is that the elevator safety monitoring system, the elevator system, the elevator drive unit, and the method at least alleviate some of the drawbacks in the known elevators. Still another objective is that smaller and less expensive safety devices may be used. Still another objective is that safety devices of unified structure and/or size and/or dimensioning may be used in different elevators irrespective of their different rated speed, if any.

The objectives of the invention are reached by an elevator safety monitoring system, an elevator system, an elevator drive unit, and a method for operating an elevator as defined by the respective independent claims.

According to a first aspect, an elevator safety monitoring system is provided. The elevator safety monitoring system comprises an elevator car absolute position and speed feedback device, a safety monitor connected to the absolute position and speed feedback device, a safety device and a safety zone extending inside an elevator shaft, such as at an end of the elevator shaft. The safety zone is preferably delimited by means of the safety device. The safety zone is associated with an allowable maximum speed of an elevator car, wherein the allowable maximum speed is lower than a rated speed of an elevator car outside the safety zone. Furthermore, the safety monitor is configured to determine, such as by comparing the speed of the elevator car to a speed limit, a slowdown failure of the elevator car approaching the safety zone, and, upon the determination of the slowdown failure, to command an actuator, such as a hoisting machinery brake or an elevator car brake, to decelerate the elevator car to the allowable maximum speed such that the allowable maximum speed is present before the elevator car enters the safety zone.

Furthermore, the safety zone may extend to a section of the elevator shaft, the section being allocated to elevator service during normal elevator operation.

In various embodiments, the elevator safety monitoring system comprises a safety device, such as a movable stop or an automatically pre-triggered safety device, that in an activated state obstructs movement of the elevator car in the safety zone, thereby establishing a safety space into the safety zone, and in a non-activated state allows movement of the elevator car in the safety zone. Optionally, the safety device may be dimensioned to absorb kinetic energy of the elevator car moving with a full load at the allowable maximum speed.

Alternatively or in addition, the safety device may be arranged so that, if in the activated state, it is operated to decelerate the elevator car or the elevator car comes in contact with it at maximum at the allowable maximum speed.

Alternatively or in addition, the safety monitor may be configured to decelerate the elevator car, if the elevator car approaches the safety zone with a speed exceeding a speed limit, wherein the speed monitor may be, for example, arranged to provide the command to operate the actuator, such as of the hoisting machinery brake.

In various embodiments, the determination of the slowdown failure may comprise comparing the speed of the elevator car to a speed limit. Optionally, the speed limit may be configured to decrease to the value of the allowable maximum speed when approaching the safety zone from a rated speed zone of the elevator shaft.

In various embodiments, the method may further comprise a safety switch that in an activated state causes an emergency stop of an elevator, the safety switch being disposed to an extension of the safety zone to cause emergency stop of the elevator already before arrival of the car at the safety zone.

According to a second aspect, an elevator system, such as a single elevator or an elevator group, is provided. The elevator system, or the elevator, comprises an elevator car movable in an elevator shaft and a safety device for establishing a temporary safety space into a safety zone. The elevator system further comprises the elevator safety monitoring system according to the first aspect.

According to a third aspect, an elevator drive unit is provided. The elevator drive unit comprises an input for receiving absolute position and speed information of an elevator car and a processing unit configured to calculate a motion profile of an elevator car; wherein the elevator car is configured to be driven by the elevator drive unit according to the motion profile. The motion profile includes a rated speed portion and a safety zone portion, wherein the maximum speed of the safety zone portion is lower than the rated speed, that is the maximum, of the rated speed portion. Optionally, preferably, the maximum speed of the safety zone portion may be selected based on an allowable maximum speed associated with the safety zone.

In various embodiment, the elevator drive unit comprises at least a converter unit.

According to a fourth aspect, a method of operating an elevator, such as comprised in an elevator system, is provided. The method comprises receiving, at a control unit of the elevator, a request to drive an elevator car to a destination, generating, at the control unit, an elevator car motion profile to serve the request, the motion profile including at least an acceleration, a rated speed, and a deceleration of the elevator car, and determining, by the control unit, if there is a safety zone within a route of the elevator car to the destination, and if there is, then including a safety zone portion into the elevator car motion profile for covering the safety zone, wherein the speed of the safety zone portion is lower than the rated speed in the motion profile.

In an embodiment, the speed of the safety zone portion is less than or equal to the allowable maximum speed.

In some embodiments, the safety zone portion comprises a constant speed portion, wherein the constant speed is not higher than the allowable maximum speed.

According to a fifth aspect, an elevator or an elevator system is provided. The elevator comprises an elevator car and an elevator drive unit according to the third aspect of the invention.

The present invention provides an elevator safety monitoring system, an elevator system, an elevator drive unit, and a method for operating an elevator. The present invention provides advantages over known solutions in that it allows the use of smaller safety devices even though the rated speed of the elevator would be high.

Various other advantages will become clear to a skilled person based on the following detailed description.

The terms "first", "second", and so on are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
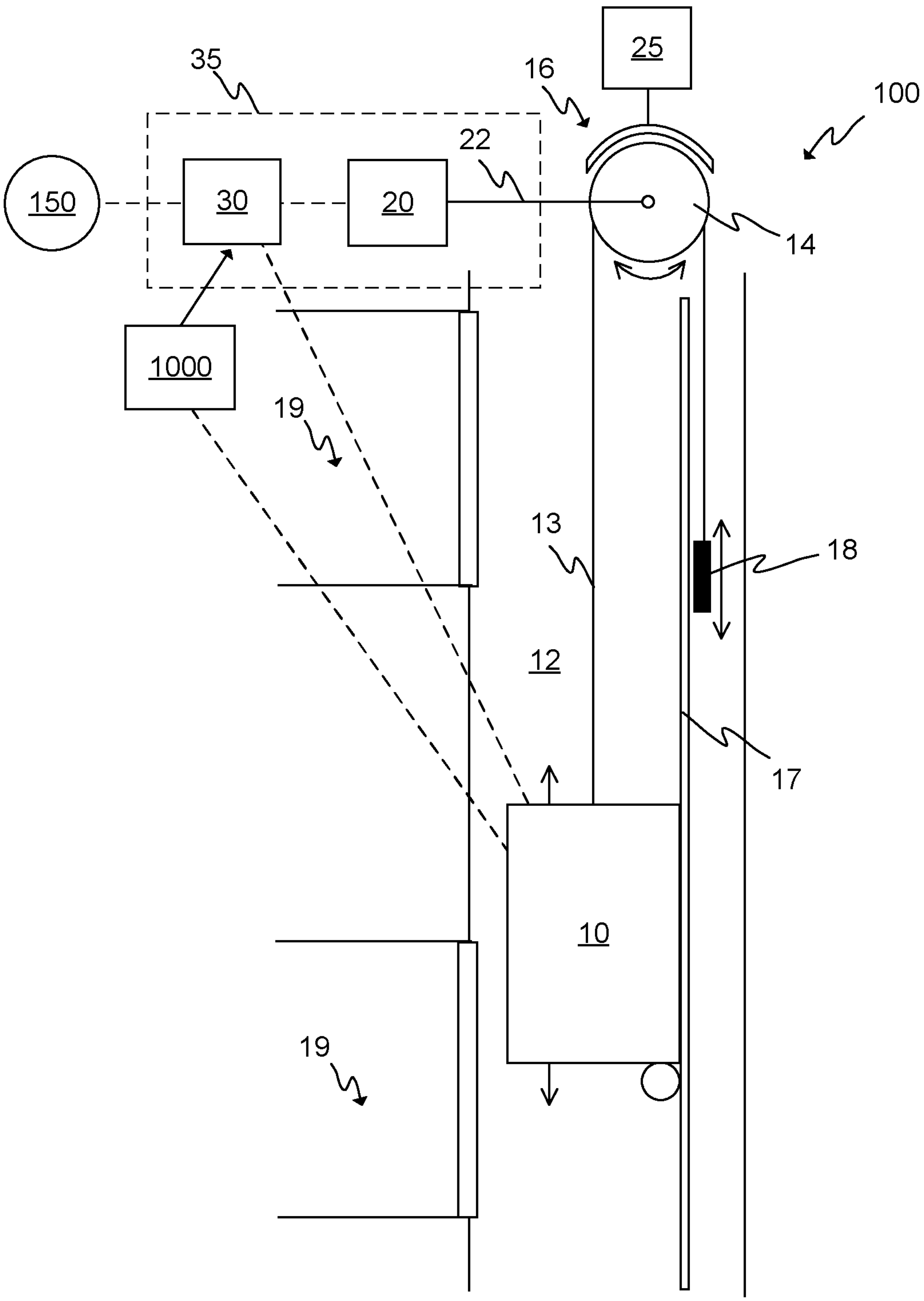
FIG. 1 illustrates schematically an elevator system or an elevator according to an embodiment of the present invention.

FIG. 1 illustrates schematically an elevator system 100 according to an embodiment of the present invention. The elevator system 100, or as visible in the figure, an elevator 100, may comprise an elevator car 10 arranged to be moved or movable in an elevator shaft 12. The moving of the elevator car 10 may be implemented, preferably, by a hoisting rope or belt 13 in connection with a traction sheave 14 or the like. Furthermore, the elevator 100 comprises an electric motor 20 arranged to operate, such as rotate by the rotor thereof, the traction sheave 14 for moving the elevator car 10, if not essentially directly coupled to the hoisting rope 13. The traction sheave 14 may be connected, via a mechanical connection 22, directly or indirectly via a gear to a shaft of the motor 20. The elevator 100 may comprise a machine room or be machine roomless, such as have the motor 20 in the elevator shaft 12.

The elevator 100 may preferably comprise landings 19 or landing floors and, for example, landing floor doors and/or openings, between which the elevator car 10 is arranged to be moved during the normal elevator operation, such as to move persons and/or items between said landings 19.

In various embodiments, the elevator shaft 12 may be such that when the elevator car 10 is at the bottom and/or top landing 19, there is essentially no space in the shaft 12 for, for example, maintenance personnel. Such an elevator 100 may be referred to as a Low Pit Low Headroom elevator. In some embodiments, the height of the pit, that is the bottom portion of the shaft 12, and/or the headroom, that is the top portion of the shaft 12, may be, for example, less than or equal to 2.5 meters or less than 1.5 meters, or even less than 1 meter.

The elevator 100 may preferably comprise at least one, or at least two, hoisting machinery brake(s) 16 configured for resisting or, preferably, preventing the movement of the motor 20, that is the rotor thereof, directly or via the traction sheave 14 or components thereof and/or therebetween. Furthermore, the elevator 100 may comprise a brake controller 25 configured to operate at least one of the at least one hoisting machinery brake 16. The brake controller 25 may further be in connection with other elements of the elevator 100, such as an elevator controller 1000. The brake controller 25 may comprise an actuator (not shown) for operating the brake 16 or at least be in connection with such an actuator.

There may additionally be, at least in some embodiments, a counterweight 18 arranged in connection with the elevator car 10 such as is known to a person skilled in the art of elevators. Still further, the elevator 100 may additionally comprise a guide rail 17 or rails 17 arranged into the elevator shaft 12 for guiding the movement of the elevator car 10. The elevator car 10 may comprise guide shoes, rollers or the like in moving in contact with the guide rails 17.

The elevator 100 of FIG. 1 further comprises an elevator drive unit 35, such as comprising at least a converter unit 30 and preferably the elevator motor 20. The elevator drive unit 35, such as the converter unit 30 thereof, may comprise an input for receiving absolute position and speed information of an elevator car 10, such as from an encoder mounted to the elevator car 10 or to the elevator motor 20, and a processing unit configured to calculate a motion profile of an elevator car 10. The elevator car may be configured to be driven by the elevator drive unit 35 according to the motion profile. Furthermore, the motion profile may include a rated speed portion and a safety zone portion. The maximum speed of the safety zone portion may be lower than the rated speed of the rated speed portion.

Furthermore, the converter unit 30 may comprise, or substantially be, an inverter or a frequency converter, for connecting to, and controlling the operation of, the motor 20, and a controller in connection with the converter unit 30, wherein the controller is configured to operate the converter unit 30 to provide electrical power (signals), such as having variable voltage and variable frequency, to the windings of the motor 20. The controller may be a separate controller device or be comprised in the converter unit 30, for instance.

Still further, the converter unit 30 may be arranged to be fed by an electrical power source 150, such as of the elevator 100, for example from an external electrical power grid or mains power supply, or another power source, for example, a battery system. Additionally, the electrical power source 150 may intake electrical power from the converter unit 30.

In various embodiments, the elevator 100 comprises an elevator controller 1000. The elevator controller 1000 may be disposed in a door frame of a landing 19 or in a landing door frame. The converter unit 30 may be disposed in the elevator shaft 12 or the hoistway 12. The converter unit 30 supplies power from mains to the electric motor 20 of the hoisting machine to drive an elevator car 10. The elevator controller 1000 may be configured to receive service requests from elevator passengers, such as via an elevator call request system, and calculate a motion profile for the elevator car 10 to serve the service requests. The converter unit 30 controls elevator hoisting machine such that elevator car speed is in accordance with the motion profile.

Figure 2:
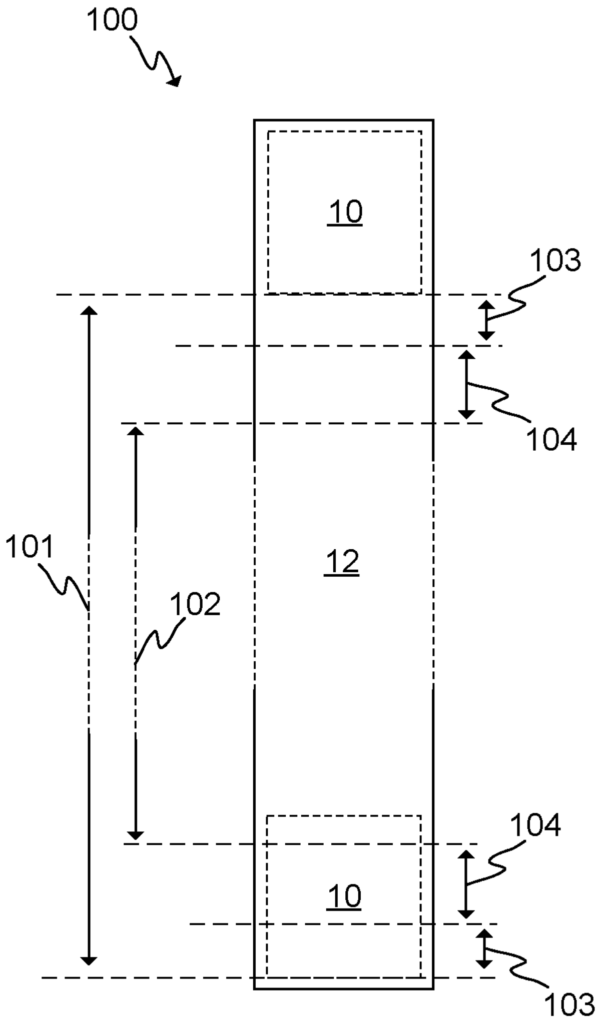
FIG. 2 illustrates schematically an elevator system according to an embodiment of the present invention.

FIG. 2 illustrates schematically an elevator system 100 according to an embodiment of the present invention. In FIG. 2, various zones of the elevator shaft 12 are shown. The first zone 101 refers to the total travel height of the elevator car 10. Ends of this zone provide, either mechanically and/or otherwise, limits to the total travel of the elevator car 10 in the elevator shaft 12.

There may also be a rated speed zone 102, or the second zone, in which, or at least part of which, the elevator car 10 may be configured to move at a rated speed. The rated speed may be, for example, in the range 1 to 25 or more meters per second, or preferably 1.25 to 5 meters per second, or most preferably, from 1.5 to 2 meters per second. Naturally, there may be landings 19, for instance, in this rated speed zone 102 so that the elevator car 10 may be configured to move slower than the rated speed when arriving or leaving the landing 19. There may also be other reasons for deviating from the rated speed in this zone 102. For example, in the proximity of extreme landings of the hoistway 12, the elevator car 10 may be configured to move gradually slower when approaching said extreme landing.

The elevator of FIG. 2 may comprise short pit buffers for normal elevator operation, such as polyurethane buffers. Alternatively, it may be possible that no such buffers are provided for normal elevator operation.

Furthermore, there may be at least one, such as one or two, safety zones 104 in the elevator shaft 12. The safety zone 104 or zones 104 may be at the end or ends of the elevator shaft 12. The safety zone(s) 104 may be associated with the allowable maximum speed. Thus, the elevator car 10, when approaching to safety zone 104, may preferably be arranged to decelerate to the allowable maximum speed before entering the safety zone 104, if moving at a higher speed than the allowable maximum speed. The allowable maximum speed is arranged to be lower than the rated speed and, optionally, in some embodiments, it may be in the range from 0.1 meters per second or less but higher than zero, to five, or preferably two, or more preferably one meter per second. In some embodiments, the allowable maximum speed may preferably be associated with the rated speed of the safety devices related to providing a safety space at the top, or to the headroom, or bottom, or to the pit, of the elevator shaft 12.

The third zone 103 or zones 103 refer(s) to zone(s) in which the elevator car 10 may be configured to decelerate when approaching an end, such as the top end or the bottom end, of the elevator shaft 12. There may be arranged limits and/or devices for performing the deceleration as is known to a skilled person in the art, or the motion profile may be configured to take into account slowing down of the elevator car 10 to the top or the bottom of the elevator shaft 12.

In some embodiments, the third zone(s) 103 may form a part of the safety zone 104 in that the elevator car 10 may, for example, move at most at the allowable maximum speed during first part of the safety zone 104 and then start to decelerate in accordance with elevator car movement requirement associated with the third zone(s) 103 or the like.

In various embodiments, the elevator car 10 may be arranged to decelerate from the rated speed to the maximum allowable speed prior to entering the safety zone 104.

It is to be noted that even though the dimensions of the zones 101-104 with respect to each other in FIG. 2 are not to pose limitations to the scope of the present invention, in many cases the rated speed zone 102, or the total length of the parts thereof, is significantly longer than the safety zone(s) 104 and/or the third zone(s) 103. In many cases the length of the rated speed zone 102, or the total length of the parts thereof, may be over half of the first zone 101.

The safety zone(s) 104 provide advantages in that it/they allow(s) the use of smaller safety devices even though the rated speed of the elevator would be high. Furthermore, with smaller than rated speed associated safety zone(s) 104, it is also possible to reduce car jump as the speed is reduced and controlled before end terminal of the elevator shaft 12.

Figure 3:
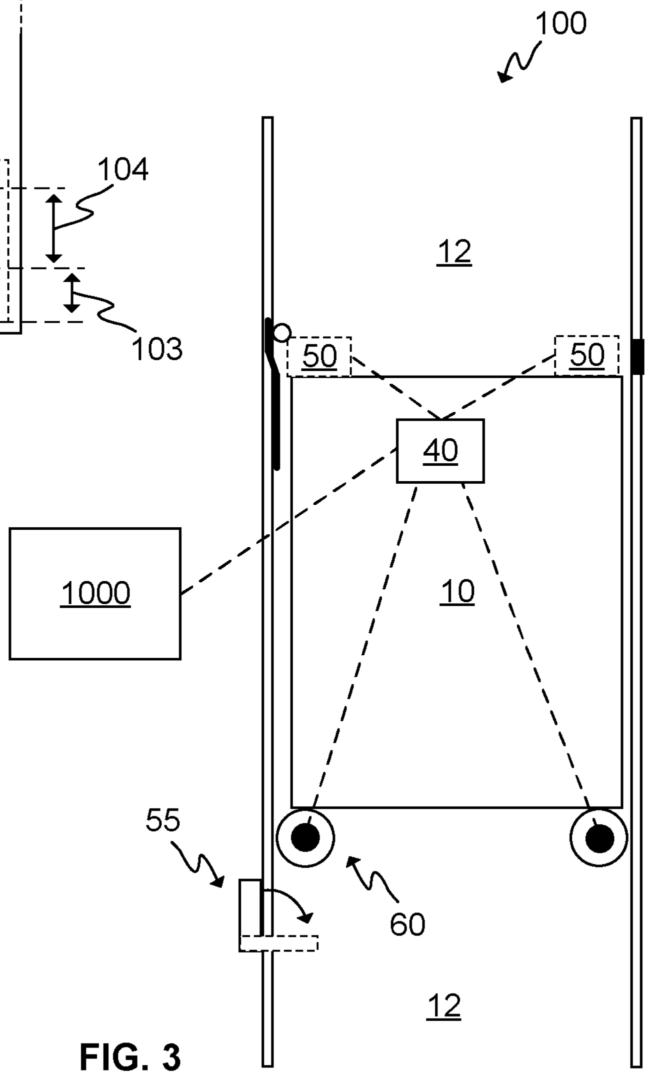
FIG. 3 illustrates schematically an elevator system according to an embodiment of the present invention.

FIG. 3 illustrates schematically an elevator system 100 according to an embodiment of the present invention. The elevator system 100 comprises an elevator car 10 movable in an elevator shaft 12 and, preferably, a safety device 55, such as for establishing a temporary safety space into a safety zone 104. The elevator system 100 may comprise an elevator safety monitoring system according to an embodiment of the present invention. The elevator safety monitoring system may comprise an elevator car absolute position and speed feedback device 60, such as comprising absolute position sensor. In various embodiments, the elevator car absolute position and speed feedback device 60 may be, for example, a magnetic encoder in the elevator car diverter pulley or in the over speed governor. Information of the magnetic encoder is preferably verified and, if necessary, corrected with information from door zone sensor (i.e. the sensor providing accurate information of door zone position, wherein elevator car floor is flush with a landing floor).

Furthermore, in FIG. 3, the elevator safety monitoring system may comprise a safety monitor 40 connected to the absolute position and speed feedback device 60. Still further, the elevator safety monitoring system may comprise a safety zone 104 extending inside an elevator shaft 12, wherein the safety zone 104 may be associated with an allowable maximum speed of an elevator car 10. The allowable maximum speed is preferably lower than a rated speed of an elevator car 10 outside the safety zone 104, such as in the rated speed zone 102. Further, the safety monitor 40 may be configured to determine a slowdown failure of the elevator car 10 approaching the safety zone 104, and, upon the determination of the slowdown failure, to command an actuator, such as a hoisting machinery brake 16 or an elevator car brake, to decelerate the elevator car 10 to the allowable maximum speed. The safety monitor 40 may comprise an absolute speed and position control unit. In various embodiments, the safety monitor 40 is, optionally at least partly, a SIL3 (safety integrity level 3) electrical safety control system.

In some embodiments, the safety monitor 40 may be integrated with some other control entity, such as elevator control unit 1000 or of the drive unit 35.

In various embodiments, the safety device 55 is a movable stop or an automatically pre-triggered safety device. Movable stop may be a turnable or an erectable buffer. Pre-triggered safety device may be a detent mounted to elevator hoistway 12, which may be transferrable between active and inactive position. In active position it triggers elevator car safety gear when elevator car 10 arrives at the detent. In inactive position, it allows the elevator car 10 to pass the detent and enter the safety zone 104.

In some embodiments, the elevator safety monitoring system may comprise a safety switch 50. The safety switch 50 may be based on a bi-stable magnetic reader and a position magnet (on the right in FIG. 3), or on an electro-mechanical limit switch and a ramp (on the left in FIG. 3). The safety switch 50 may be connected to the operation of the safety device 55 such that the safety switch 50 is activated and deactivated in tandem with the safety device. The safety switch 50 may be connected to elevator safety chain such that in activated state operation of the safety switch causes an emergency stop of the elevator 100. In deactivated state (e.g. during normal elevator operation) safety switch 50 allows elevator car to pass it with-out causing an emergency stop. In emergency stop situation, hoisting machinery brakes are engaged and power supply to elevator hoisting motor is interrupted. The safety switch 50 may be disposed to an extension of the safety zone 104 such that in activated state it will cause emergency stop of the elevator 100 already before arrival of the car at the safety zone (104). In other words, it will provide an extended safety space for a maintenance personnel working in elevator shaft 12.

In some embodiments, elevator car may have a movable or turnable or liftable roof or a roof hatch, such that maintenance personnel may work in the safety space via the roof/roof hatch, being located only partially outside of the car 10.

Figure 4A:
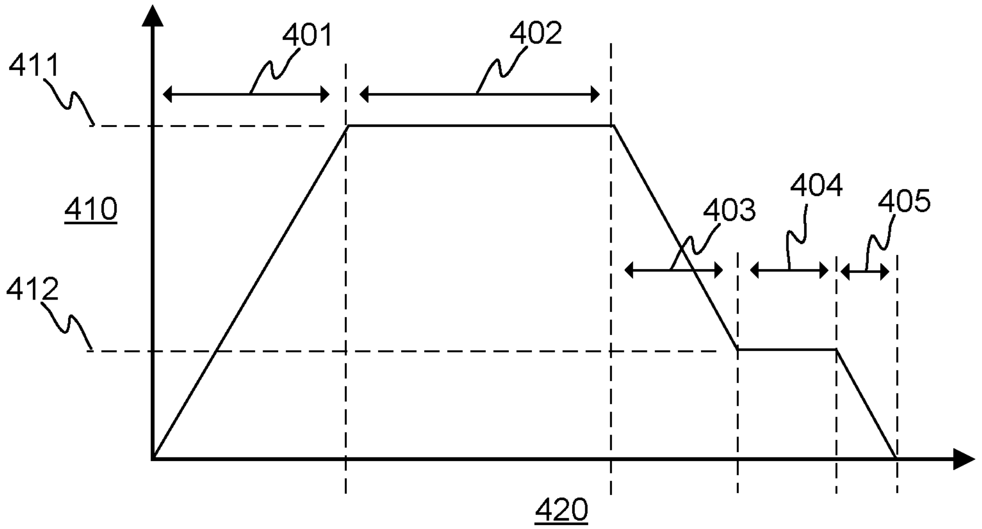
FIGS. 4A and 4B show motion profiles in accordance with an embodiment of the present invention.
Figure 4B:
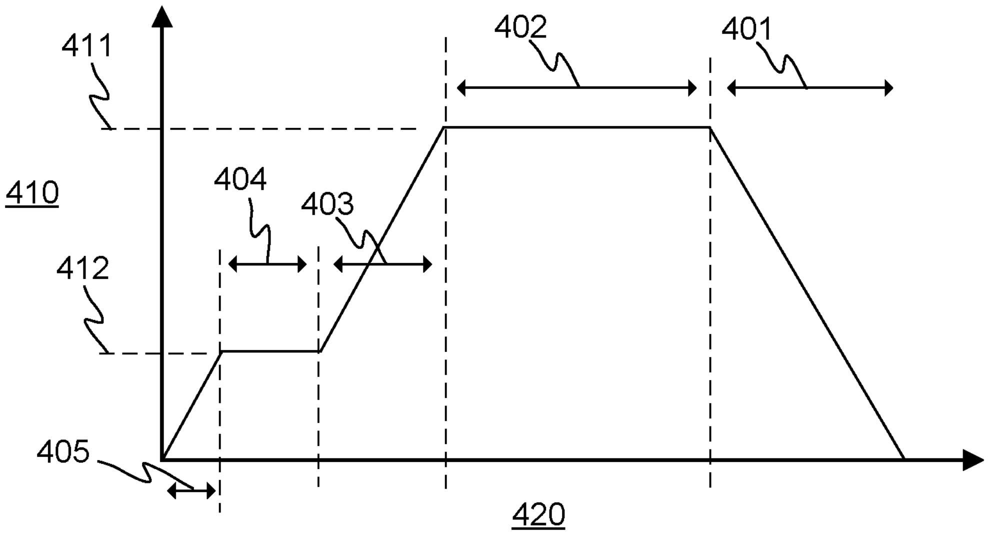

FIGS. 4A and 4B show motion profiles in accordance with an embodiment of the present invention. In FIGS. 4A and 4B, the vertical axis 410 represents speed and the horizontal axis 420 position in the shaft 12, on the left being the bottom end and on the right the top end. In FIG. 4A, is a motion profile in case of an elevator car 10 traveling up the elevator shaft 12. The acceleration portion 401 is typical, going from zero to the rated speed 411. Then the elevator car 10 is arranged, in accordance with the motion profile, to travel at the rated speed portion 402. In the case of FIG. 4A, the route of the elevator car 10 is such that it includes or is to be included a safety zone 104 as described hereinbefore. Thus, the deceleration portion 403 is such that the elevator car 10 is decelerated from the rated speed 411 to the allowable maximum speed 412 associated with the safety zone 104. The elevator car 10 may then be moved at the safety zone portion 404, such as by passing the safety device(s) 55 intended to be in their non-activated state, at the allowable maximum speed 412. Finally, the terminal deceleration portion 405 refers to stopping at the terminal of the elevator shaft 12, such as at the top or bottom of the shaft 12.

In FIG. 4*b*, the motion profile when traveling down the elevator shaft 12 is shown. As can be seen, the motion profile may include the corresponding portions as shown in FIG. 4A.

Even though in FIGS. 4A and 4B, the motion profiles are identical, although mirror images of each other, and asymmetric, they may have various shapes within the scope of the present invention. For example, the allowable maximum speed may be configured to be different in the top and the bottom ends, for instance. Optionally, the length of the safety zones 104 may differ with respect to each to other.

In various embodiments, the determination of the slowdown failure, as described hereinbefore, may comprise comparing the speed of the elevator car to a speed limit. Optionally, the speed limit is configured to decrease when the car 10 approaches the safety zone 104 such that, when the brakes have been activated, the speed of the car 10 can be reduced to the value of the allowable maximum speed before entering the safety zone 104. Thus, the speed of the elevator car 10 at the deceleration portion 403 may be monitored and, preferably, a speed limit which is adapted to reduce may be utilized to be compared with the current speed of the elevator car 10.

Figure 5:
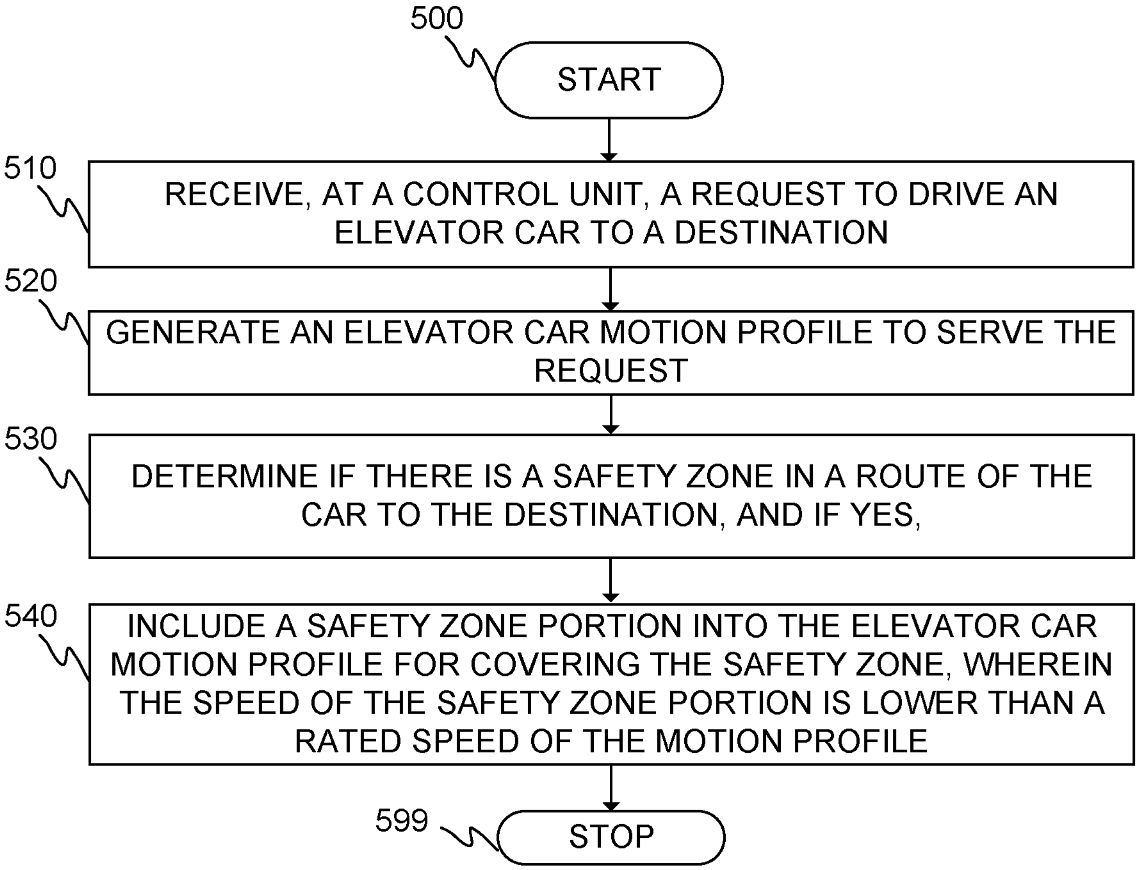
FIG. 5 shows a flow diagram of a method according to an embodiment of the present invention.

FIG. 5 shows a flow diagram of a method according to an embodiment of the present invention.

Step 500 refers to a start-up phase of the method. Suitable equipment and components are obtained and systems assembled and configured for operation.

Step 510 refers to receiving, at a control unit, such as the elevator controller 1000, of the elevator, a request to drive an elevator car 10 to a destination, such as to landing, optionally, at the top or bottom of the elevator shaft 12.

Step 520 refers to generating, at the control unit, an elevator car motion profile to serve the request, the motion profile including at least an acceleration 401, a rated speed 402, and a deceleration of the elevator car 403.

Step 530 refers determining, by the control unit, if there is a safety zone 104 within a route of the elevator car 10 to the destination, and if there is, then performing step 540.

Step 540 refers to including a safety zone portion 404 into the elevator car motion profile for covering the safety zone 104, wherein the speed, that is the allowable maximum speed 412, of the safety zone portion 404 is lower than the rated speed 411 in the motion profile.

Method execution is stopped at step 599. The method may be performed each time the elevator car 10 is being moved.

Figure 6A:
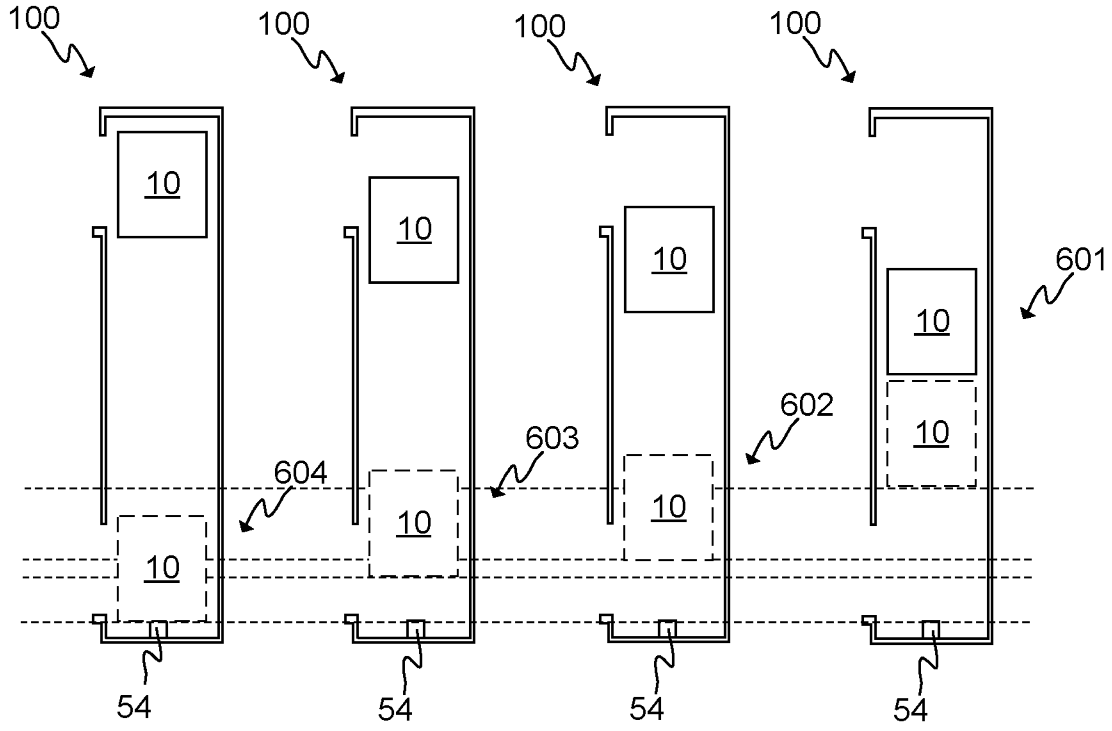
FIGS. 6A and 6B illustrate elevator car movement in accordance with motion profiles according to some embodiments of the present invention.
Figure 6B:
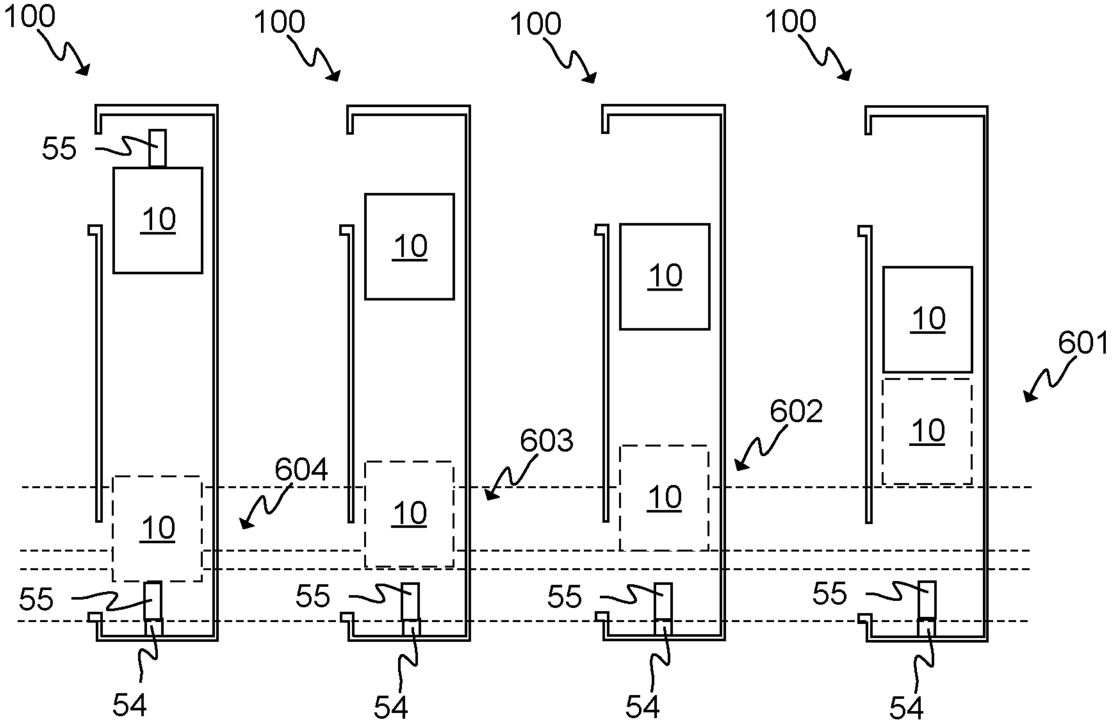

FIGS. 6A and 6B illustrate elevator car movement in accordance with motion profiles according to some embodiments of the present invention. The motion profile related to FIG. 6A is intended for normal drive of the elevator car 10. Thus, the safety devices 55 in accordance with various embodiments are in non-activated state. In FIG. 6A, there is a normal safety device 54 arranged to the bottom of the shaft 12. The normal safety device 54 does not extend to the elevator car route during normal drive, however, provides safety if the car 10 for some reason collides with the bottom of the shaft 12.

At 601, the elevator car 10 is at a position or distance from the bottom or top floor when the deceleration portion 403 starts. at 602, the elevator car 10 is at a position or distance from the bottom or top floor when the safety zone portion 404 starts. At 603, the elevator car 10 is at a position or distance from the bottom or top floor when the terminal deceleration portion 405 starts. Finally, at 604, the elevator car 10 has stopped at the top or bottom of the shaft 12.

The motion profile related to FIG. 6B is intended for maintenance drive of the elevator car 10. In case of FIG. 6B, safety devices 55. being movable stops or maintenance drive extensions, has been arranged to provide a safe space into the top or bottom of the shaft 12. In various embodiments, the safety devices 55 may be dimensioned for the allowable maximum speed 412 since the elevator safety monitoring system is configured to the control the movement of the elevator car 10 such that it can collide with the safety device 55 at most at the allowable maximum speed 412.

The invention claimed is:

1. An elevator safety monitoring system comprising:

an elevator car absolute position and speed feedback device;

a safety monitor connected to the absolute position and speed feedback device;

a safety device fixed into and relative to an elevator shaft; and a safety zone extending inside an elevator shaft, the safety zone being delimited by means of the safety device, wherein the safety zone is associated with an allowable maximum speed of an elevator car, wherein the allowable maximum speed is lower than a rated speed of the elevator car outside the safety zone, wherein the safety device is configured to change between an activated state and a non-activated state, in an activated state the safety device is arranged to extend to a section of the elevator shaft in which the elevator car is allowed to be moved during normal operation of the elevator and to obstruct movement of the elevator car into the safety zone, thereby establishing a safety space into the safety zone, and in a non-activated state the safety device is arranged to allows movement of the elevator car into the safety zone, and wherein the safety monitor is configured to determine a slowdown failure of the elevator car approaching the safety zone, and, upon the determination of the slowdown failure, command an actuator to decelerate the elevator car to the allowable maximum speed.

2. The elevator safety monitoring system of claim 1, wherein the safety zone extends to a section of the elevator shaft, the section being allocated to elevator service during normal elevator operation.

3. The elevator safety monitoring system of claim 2, wherein the safety device is dimensioned to absorb kinetic energy of the elevator car moving with a full load at the allowable maximum speed.

4. The elevator safety monitoring system of claim 2, wherein the safety device is arranged so that, if in the activated state, it is operated to decelerate the elevator car or the elevator car comes in contact with it at maximum at the allowable maximum speed.

5. The elevator safety monitoring system of claim 2, wherein the safety monitor is configured to decelerate the elevator car, if the elevator car approaches the safety zone with a speed exceeding a speed limit, wherein a speed monitor is arranged to provide a command to operate the actuator.

6. The elevator safety monitoring system of claim 1, wherein the safety device is dimensioned to absorb kinetic energy of the elevator car moving with a full load at the allowable maximum speed.

7. The elevator safety monitoring system of claim 6, wherein the safety device is arranged so that, if in the activated state, it is operated to decelerate the elevator car or the elevator car comes in contact with it at maximum at the allowable maximum speed.

8. The elevator safety monitoring system of claim 6, wherein the safety monitor is configured to decelerate the elevator car, if the elevator car approaches the safety zone with a speed exceeding a speed limit, wherein a speed monitor is arranged to provide a command to operate the actuator.

9. The elevator safety monitoring system of claim 1, wherein the safety device is arranged so that, if in the activated state, it is operated to decelerate the elevator car or the elevator car comes in contact with it at maximum at the allowable maximum speed.

10. The elevator safety monitoring system of claim 1, wherein the safety monitor is configured to decelerate the elevator car, if the elevator car approaches the safety zone with a speed exceeding a speed limit, wherein a speed monitor is arranged to provide a command to operate the actuator.

11. The elevator safety monitoring system of claim 1, wherein the safety zone is at an end of the elevator shaft.

12. The elevator safety monitoring system of claim 1, wherein the determination of the slowdown failure comprises comparing the speed of the elevator car to a speed limit, the speed limit configured to decrease to a value of the allowable maximum speed-when approaching the safety zone from a rated speed zone of the elevator shaft.

13. The elevator safety monitoring system of claim 1, wherein the actuator is a hoisting machinery brake or an elevator car brake.

14. The elevator safety monitoring system of claim 1, wherein the safety device is a movable stop.

15. The elevator safety monitoring system of claim 1, wherein the safety device is an automatically pre-triggered safety device.

16. The elevator safety monitoring system of claim 1, further comprising a safety switch that in an activated state causes an emergency stop of an elevator, the safety switch being disposed to an extension of the safety zone to cause emergency stop of the elevator already before arrival of the car at the safety zone.

17. An elevator system comprising:

the elevator safety monitoring system of claim 1;

the elevator car movable in the elevator shaft; and the safety device for establishing a temporary safety space into a safety zone.

18. An elevator comprising:

the elevator safety monitoring system of claim 1;

the elevator car; and an elevator drive unit comprising:

an input for receiving absolute position and speed information of the elevator car;

a processing unit configured to calculate a motion profile of the elevator car, wherein the elevator car is configured to be driven by the elevator drive unit according to the motion profile, the motion profile including a rated speed portion and a safety zone portion, wherein the maximum speed of the safety zone portion is lower than the rated speed of the rated speed portion.

19. The elevator of claim 18, wherein the elevator drive unit is configured to select the maximum speed of the safety zone portion based on an allowable maximum speed associated with the safety zone.

20. A method of operating the elevator according to claim 18, the method comprising:

receiving, at a control unit of the elevator, a request to drive an elevator car to a destination;

generating, at the control unit, an elevator car motion profile to serve the request, the motion profile including at least an acceleration, a rated speed, and a deceleration of the elevator car;

determining, by the control unit, if there is a safety zone within a route of the elevator car to the destination, and if there is, then including a safety zone portion into the elevator car motion profile for covering the safety zone, wherein the speed of the safety zone portion is lower than the rated speed in the motion profile.

* * * * *